US012019979B2

(12) United States Patent
Metz et al.

(10) Patent No.: US 12,019,979 B2
(45) Date of Patent: Jun. 25, 2024

(54) SYSTEMS AND METHODS FOR EXTENSIBLE STORYBOARDS

(71) Applicant: Rockwell Automation Technologies, Inc., Mayfield Heights, OH (US)

(72) Inventors: Frederick G. Metz, Cary, NC (US); Sarat Shankar, Bengaluru (IN); Thomas Keller, Moenchengladbach (DE); Sachin M. Jain, Pune (IN); Anuradha M. Sardesai, Pune (IN); Komal Adke, Pune (IN); Abhijit P. Kharade, Pune (IN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/081,872

(22) Filed: Dec. 15, 2022

(65) Prior Publication Data

US 2024/0111947 A1 Apr. 4, 2024

(51) Int. Cl.
*G06F 40/186* (2020.01)
*G06F 3/0481* (2022.01)

(52) U.S. Cl.
CPC .......... *G06F 40/186* (2020.01); *G06F 3/0481* (2013.01)

(58) Field of Classification Search
CPC .............................. G06F 40/186; G06F 3/0481
See application file for complete search history.

(56) References Cited

U.S. PATENT DOCUMENTS

2017/0123397 A1* 5/2017 Billi ...................... G06F 3/0484

* cited by examiner

*Primary Examiner* — Hope C Sheffield
(74) *Attorney, Agent, or Firm* — Fletcher Yoder, P.C.

(57) ABSTRACT

A non-transitory, computer readable medium storing instructions that, when executed by a processor, cause the processor to receive, via a graphical user interface (GUI), a first input indicative of a request to generate a storyboard including one or more visualizations associated with operation of one or more industrial automation systems, wherein the request identifies first and second data from one or more data sources, retrieve the first and second data from the one or more data sources, generate a first dataset based on the first data retrieved from the one or more data sources, generate a second dataset based on the first data retrieved from the one or more data sources, and generate for display via the GUI, the storyboard based on the first dataset and the second dataset.

20 Claims, 11 Drawing Sheets

FIG. 9

SYSTEMS AND METHODS FOR EXTENSIBLE STORYBOARDS

CROSS-REFERENCE TO RELATED APPLICATION

This application claims priority to Indian Provisional Application No. 202211056028 entitled "PRE-CONFIGURED TEMPLATES AND QUERIES FOR EXTENSIBLE STORYBOARDS", filed Sep. 29, 2022, which is herein incorporated by reference in its entirety for all purposes.

BACKGROUND

The present disclosure generally relates to generating visualizations for data associated with industrial automation systems.

Industrial automation systems may be used to provide automated control of one or more actuators in an industrial setting. Data may be collected from industrial automation systems and used to generate visualizations. Storyboards may be configured to include multiple visualizations in order to provide a user with an understanding of how the industrial automation systems are operating. However, configuring storyboards may rely on the user having extensive knowledge of the underlying data, how to formulate database queries, and the intricacies of storyboard settings, making it difficult for inexperienced users and inefficient for proficient users of storyboard configuring tools. Further, datasets and storyboards are typically tightly coupled to one another, resulting in inflexible storyboards and duplicative datasets. Accordingly, improved techniques for configuring storyboards for industrial automation systems are desired.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes techniques for configuring storyboards (e.g., dashboards) containing multiple charts or tiles (e.g., widgets) using data collected from one or more industrial automation systems. First, the present application includes a graphical user interface (GUI) for configuring a storyboard that does not require a user to write code, write database queries, be intimately familiar with the underlying data, or configure every parameter or setting of the storyboard. Instead, a user selects a storyboard template, selects one or more connections to data or databases to be used to generate the charts of the storyboard, provides storyboard details (e.g., storyboard name, etc.), and then generates the storyboard. Storyboards may be modified by the user after creation as desired. Further, the user can create new connections with compatible data sources validated against queries. Connections can be made for specific types of manufacturing data and saved for subsequent use. In some embodiments, subject matter experts (SMEs) may help to develop stock queries, charts, data aggregation, and storyboard templates. The storyboard templates may be defined by included chart types, chart axes, chart configuration such as data labels, legends, tooltips, and datasets based on pre-defined queries that run to fetch data with or without aggregation and then filter the data for set time periods. For example, if the user wishes, the user can rapidly create new storyboards by single-clicking a pre-configured template and connection(s). If the user wishes, generated storyboards may be saved as templates and modified as needed. Further, the storyboards may be extensible such that relationships between storyboards and datasets may be defined as "many-to-many" relationships. For example, some storyboards may include charts generated based on data pulled from multiple datasets. When a storyboard is generated or a chart is added to a storyboard, the chart may be generated with the default dataset for the storyboard. However, the user may reconfigure the chart to be based on any dataset or datasets that are available to the user. Accordingly, a user may add data from various sources to a single storyboard. Correspondingly, multiple storyboards may include charts based on data from a single dataset. For example, a user may create a new storyboard having one or more charts that use an already-existing dataset used by one or more other storyboards. Accordingly, once a dataset has been created using one or more database queries, the dataset may be used as a source for any chart or storyboard. This prevents duplication of data, which conserves computing resources, and also prevents users from having to repeat the dataset creating process. Datasets may be mapped to database tables, views, stored procedures, custom queries, etc. and based on data sources, queues, streaming, connections, and so forth.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein:

FIG. 9 illustrates an example embodiment of a storyboard, in accordance with aspects of the present disclosure;

Figure 1:
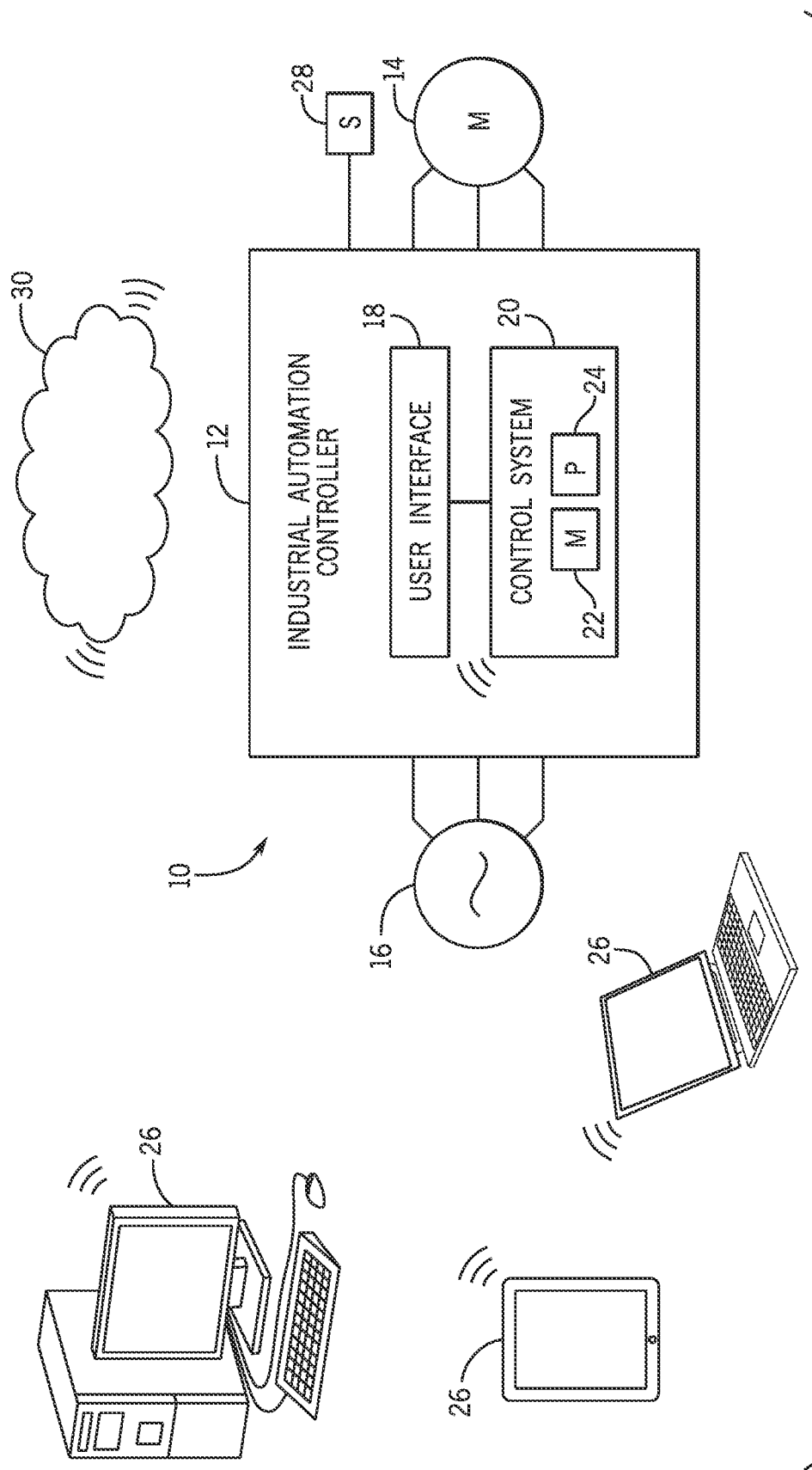
FIG. 1 illustrates a schematic view of an industrial automation system, including a controller, a computing device, and a remote server, in accordance with embodiments presented herein.
Figure 10:
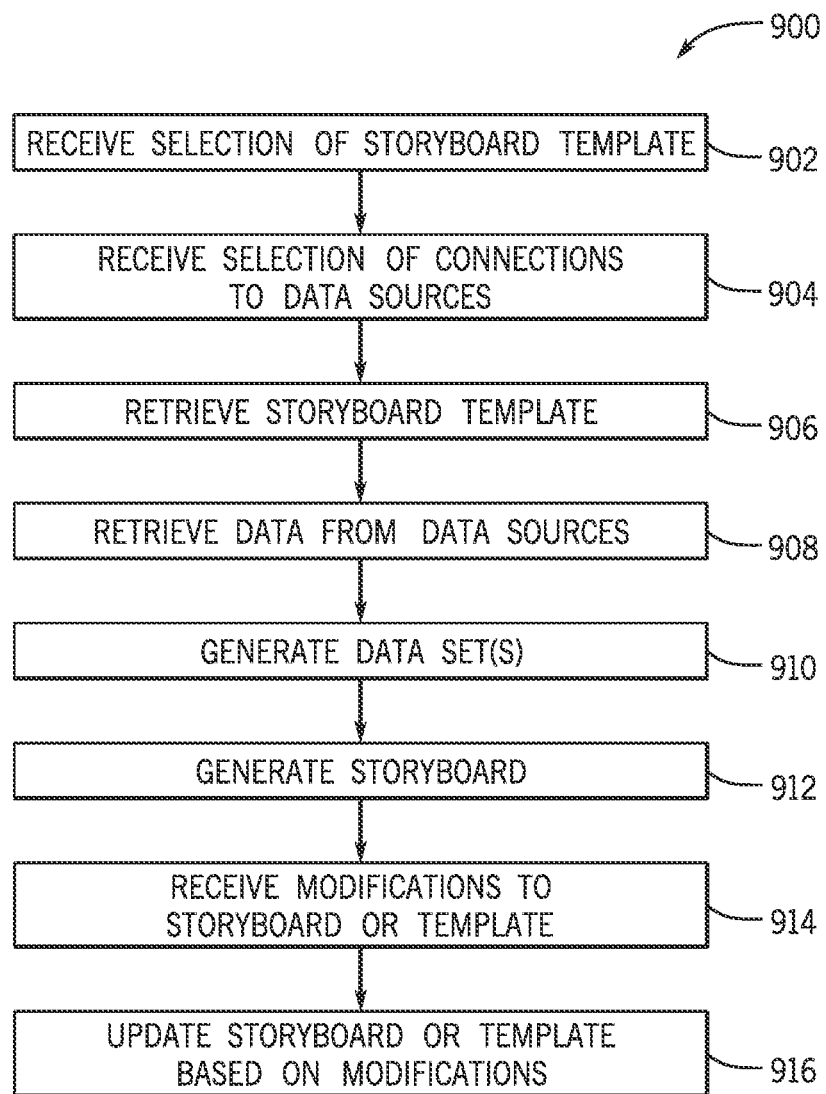
Figure 11:
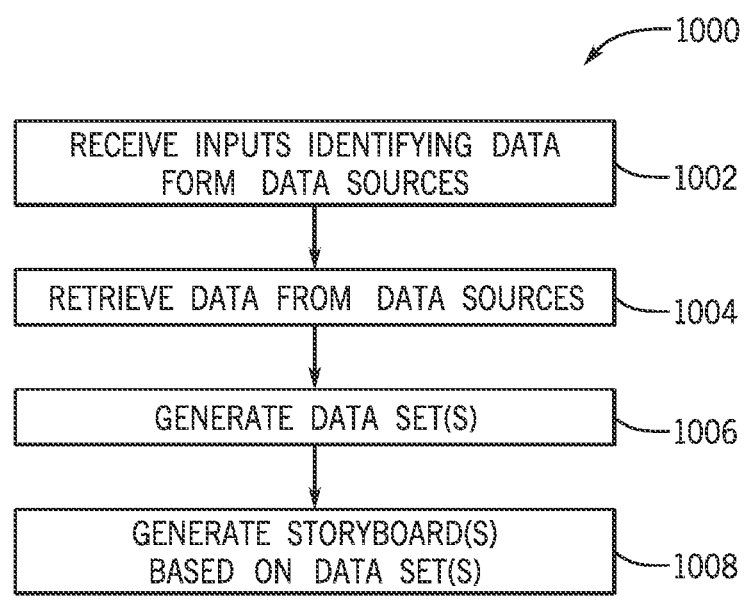

FIG. 10 illustrates a flow chart of a process for configuring and modifying storyboards associated with the industrial automation system of FIG. 1, in accordance with aspects of the present disclosure; and FIG. 11 illustrates a flow chart of a process for generating one or more storyboards based on retrieved data associated with one or more industrial automation systems as shown in FIG. 1, in accordance with aspects of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure includes techniques for configuring storyboards (e.g., dashboards) containing multiple charts or tiles (e.g., widgets) using data collected from one or more industrial automation systems. First, the present application includes a graphical user interface (GUI) for configuring a storyboard that does not require a user to write code, write database queries, be intimately familiar with the underlying data, or configure every parameter or setting of the storyboard. Instead, a user selects a storyboard template, selects one or more connections to data or databases to be used to generate the charts of the storyboard, provides storyboard details (e.g., storyboard name, etc.), and then generates the storyboard. Storyboards may be modified by the user after creation as desired. Further, the user can create new connections with compatible data sources validated against queries. Connections can be made for specific types of manufacturing data and saved for subsequent use. In some embodiments, subject matter experts (SMEs) may help to develop stock queries, charts, data aggregation, and storyboard templates. The storyboard templates may be defined by included chart types, chart axes, chart configuration such as data labels, legends, tooltips, and datasets based on pre-defined queries that run to fetch data with or without aggregation and then filter the data for set time periods. For example, if the user wishes, the user can rapidly create new storyboards by single-clicking a pre-configured template and connection(s). If the user wishes, generated storyboards may be saved as templates and modified as needed.

Further, the storyboards may be extensible such that relationships between storyboards and datasets may be defined as "many-to-many" relationships. For example, some storyboards may include charts generated based on data pulled from multiple datasets. When a storyboard is generated or a chart is added to a storyboard, the chart may be generated with the default dataset for the storyboard. However, the user may reconfigure the chart to be based on any dataset or datasets that are available to the user. Accordingly, a user may add data from various sources to a single storyboard. Correspondingly, multiple storyboards may include charts based on data from a single dataset. For example, a user may create a new storyboard having one or more charts that use an already-existing dataset used by one or more other storyboards. Accordingly, once a dataset has been created using one or more database queries, the dataset may be used as a source for any chart or storyboard. This prevents duplication of data, which conserves computing resources, and also prevents users from having to repeat the dataset creating process. Datasets may be mapped to database tables, views, stored procedures, custom queries, etc. and based on data sources, queues, streaming, connections, and so forth. Additional details with regard to configuring storyboards in accordance with the techniques described above will be provided below with reference to FIGS. 1-11.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22 and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through licensed software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis (e.g., via licensed software or paid services).

The computing device 26 may be communicatively coupled to the controller 12 via a wired or wireless connection. The computing device 26 may receive inputs from a user defining an industrial automation project using a native application running on the computing device 26 or using a website accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. As previously discussed, the controller 12 may collect feedback data during execution of the project, and the feedback data may be provided back to the computing device 26 for analysis by one or more licensed software and/or subscription services. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
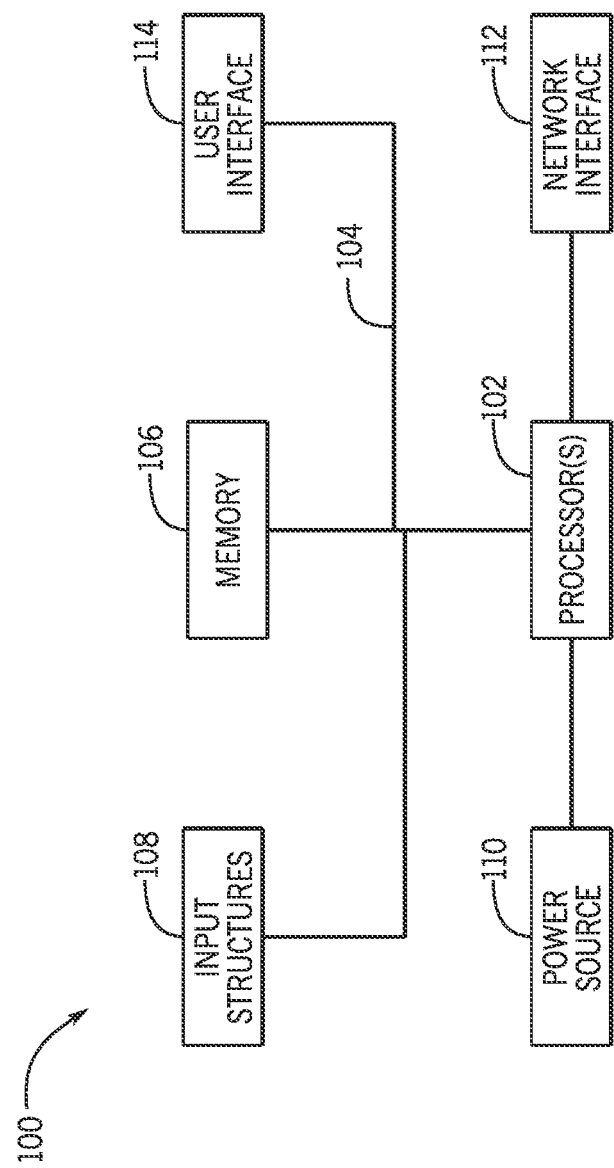
FIG. 2 illustrates a block diagram of example components that could be used as the controller, the computing device, and/or the remote server of FIG. 1, in accordance with embodiments presented herein.

FIG. 2 illustrates a block diagram of example components of a computing device 100 that could be used as the computing device 26, the cloud/remote server 30, the controller 12, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 112, a power source 114, a network interface 116, a user interface 118, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 112 may allow a user to input data and/or commands to the device 100 and may include mice, touchpads, touchscreens, keyboards, controllers, and so forth. The power source 114 can be any suitable source for providing power to the various components of the computing device 100, including line and battery power. In the depicted example, the device 100 includes a network interface 116. Such a network interface 116 may allow communication with other devices on a network using one or more communication protocols. In the depicted example, the device 100 includes a user interface 118, such as a display that may display images or data provided by the one or more processors 102. The user interface 118 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Figure 3:
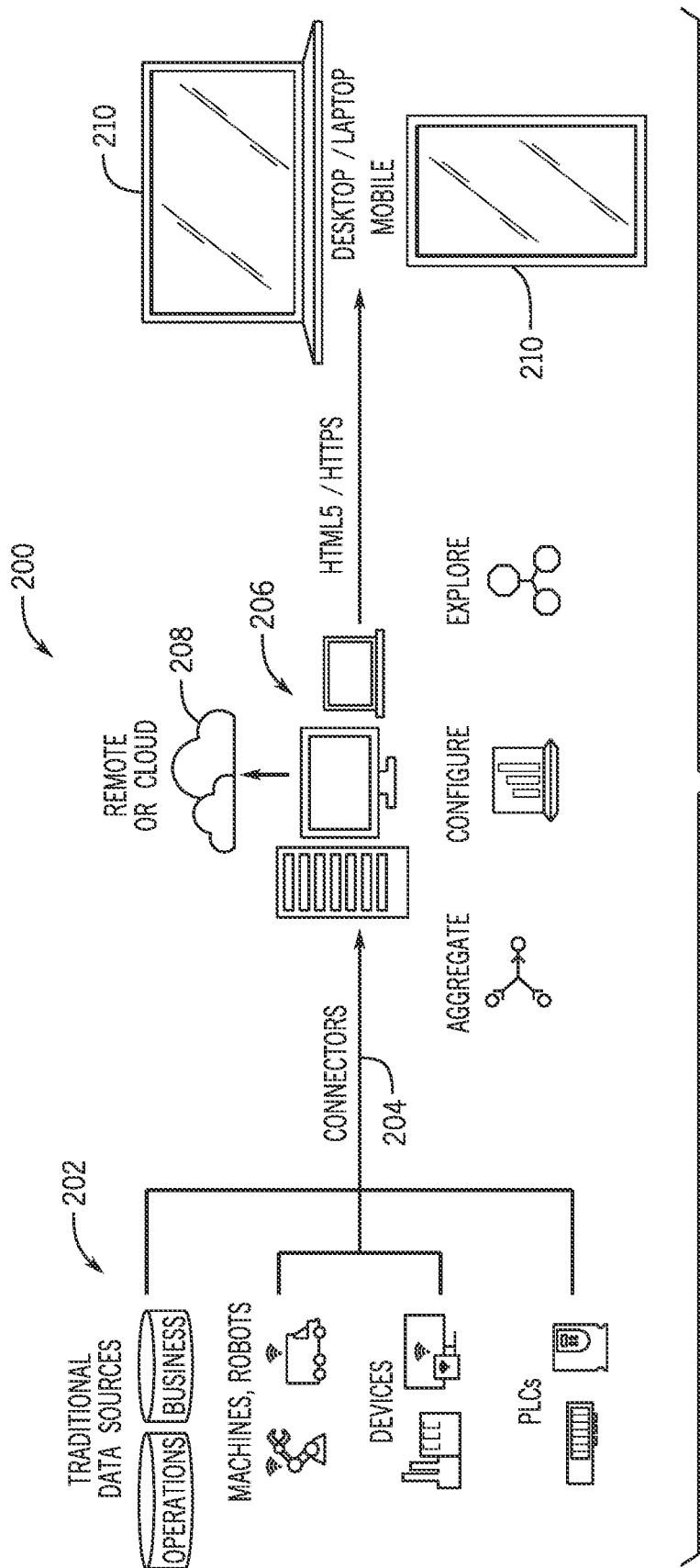
FIG. 3 illustrates a schematic of an architecture for data collection and processing within one or more enterprises operating industrial automation systems shown in FIG. 1, in accordance with embodiments presented herein.

Returning to FIG. 1, data may be generated by, or collected from one or more industrial automation systems 10 operated by an enterprise. The data may be aggregated, processed, analyzed, and used to generate visualizations depicting various aspects of how the one or more industrial automation systems 10 are operating. These visualization may be used to monitor and modify operation of the one or more industrial automation systems 10. With the preceding in mind, FIG. 3 illustrates a schematic of an architecture 200 for data collection and processing within one or more enterprises. As shown, data may be stored in or generated by one or more data sources 202. These may include operations database, business databases, shared databases, databases of training data, publicly available databases, database provided by service providers, and so forth. Further, data sources 202 may include industrial automation equipment, such as machines, robots, pumps, valves, movers, conveyors, heaters, mixers, ovens, actuators, linear motors, rotational motors, generators, as well as sensors incorporated with, coupled to, or disposed near the industrial automation equipment, such as temperature sensors, proximity sensors, location sensors, linear velocity sensors, rotational velocity sensors, accelerometers, encoders, flow meters, pressure sensors, electrical sensors, gas sensors, fluid sensors, etc. The data sources 202 may also include industrial automation controllers, such as programmable logic controllers (PLCs). Further, the data sources 202 may include devices disposed within or near industrial automation systems, such as human-machine interfaces (HMIs), dedicated device user interfaces, mobile devices, tablets, smartphones, laptop or desktop computers, workstations, om-premises ("on-prem") or remote servers, cloud computing devices, internet of things (IoT) devices, edge devices, networking devices, routers, switches, etc.

Data from the data sources 202 may be provided to or may otherwise be accessible via one or more connectors 204 to one or more on-prem devices 206. In some embodiments, the connectors 204 may be file paths or locations of specific pieces of data within the data sources 202. In other embodiments, the connectors 204 may include data mappings between various pieces of data. In further embodiments, the connectors 204 may be direct or indirect (e.g., via one or more network devices and/or one or more intermediate devices) communicative connections between the on-prem devices 206 and the data sources 202. The on-prem devices 206 may be configured to retrieve or received data, aggregate the data, process/analyze the data, identify trends in data, develop and/or apply machine learning models, generate datasets, as well as configure and generate storyboards based on the data. Storyboards may include one or more dashboards that itself includes one or more charts, such as visualizations and/or widgets, that are generated based on the data from the data sources and depict various aspects of one or more industrial automation devices operated by one or more enterprises.

As shown in FIG. 3, in some embodiments, the architecture 200 may include a remote or cloud server 208 which may perform some or all of the functions of the on-prem devices 206. For example, in some embodiments, the remote or cloud server 208 may be used to store data received via the connectors 204. In other embodiments, the remote or cloud server 208 may be utilized to perform processing of the received data. For example, the remote or cloud server 208 may be configured to apply one or more machine learning models or algorithms to the received data. Further, in some embodiments, though not shown in FIG. 3, the remote or cloud server 208 may be connected to the data sources 202 via the connectors 204 and received data directly from the data sources 202 rather than data passing through the on-prem devices 206. Further, in some embodiments, the remote or cloud server 208 may be configure and/or generate storyboards.

Storyboards may be generated by the on-prem devices 206 or the remote or cloud server 208 and provided to one or more client devices 210, which may display the storyboards via a graphical user interface (GUI). In other embodiments, the on-prem devices 206 or remote or cloud server 208 may provide one or more datasets and code defining one or more storyboards to the client devices 210, which then generate the storyboard locally and display the storyboard via a GUI. The client devices may include, for example, HMIs, dedicated device user interfaces, mobile devices, tablets, smartphones, laptop or desktop computers, workstations, and so forth. A user may pull up a storyboard on the client device 210 to view the storyboard. In some embodiments, the storyboard may be interactive such that a user may provide inputs to manipulate the storyboard and the storyboard responds to the inputs by updating the storyboard in response to the input. Along these lines, a user may provide inputs via the client device 210 to configure existing storyboards, configure new storyboards, and, in some cases, adjust one or more operating parameters of one or more industrial automation systems. Accordingly, inputs provided via the client devices 210 may be transmitted to the on-prem devices 206, the remote or cloud server 208, and/or the data sources 202. As shown in FIG. 3, communication between the client devices 210 and the on-prem devices 206 and/or the remote or cloud server 208 may be via HyperText Markup Language (HTML, e.g., HTML5), Hypertext Transfer Protocol (HTTP, e.g., HTTPS), or some other protocol via a web browser, a native application, and so forth.

Figure 4:
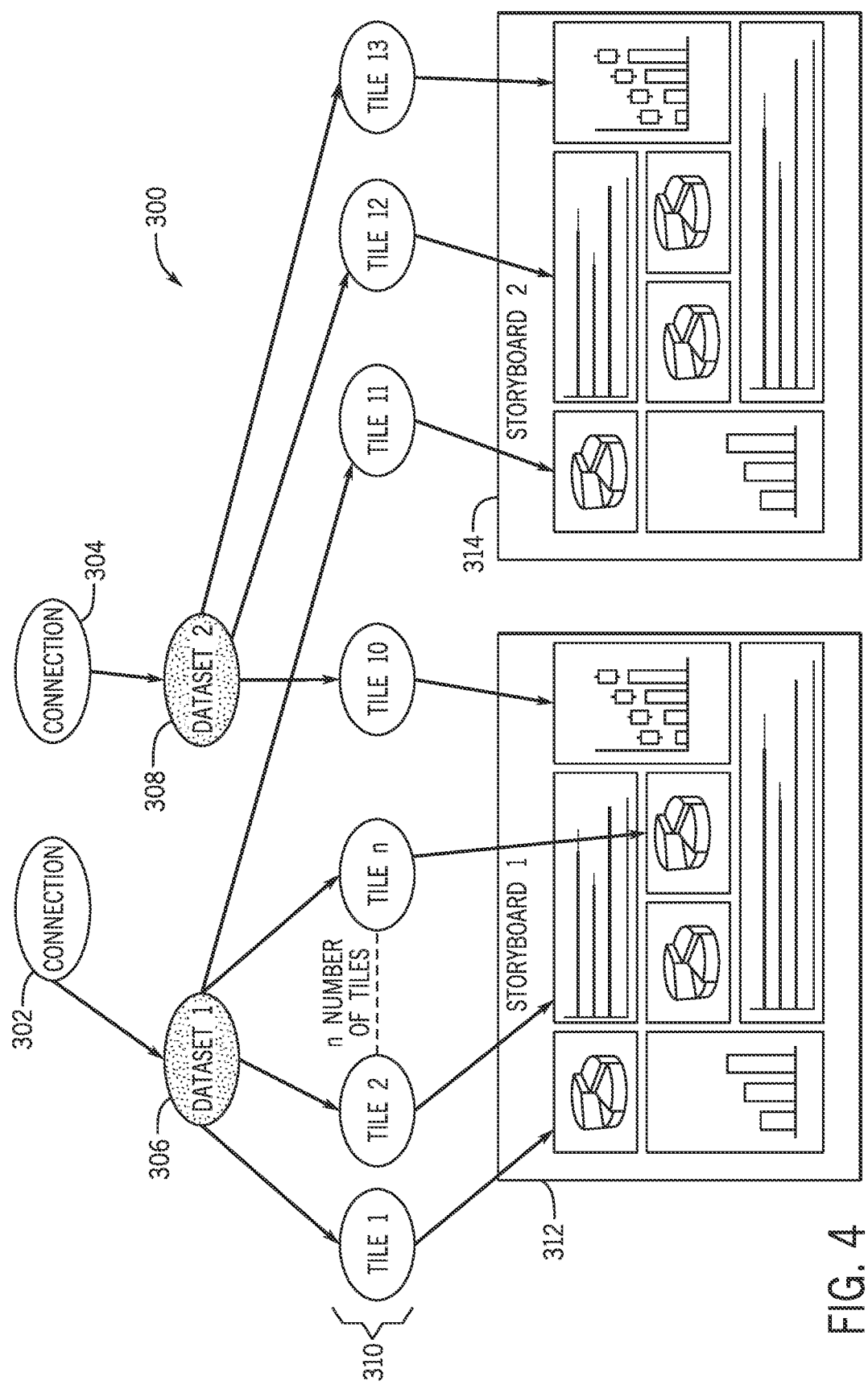
FIG. 4 is a schematic illustrating how connections with data sources are used to generate datasets, which are then used to generate tiles or charts for storyboards, in accordance with aspects of the present disclosure.

FIG. 4 is a schematic 300 illustrating how connections 302, 304 with data sources are used to generate datasets 306, 308, which are then used to generate tiles 310, which include charts, for storyboards 312, 314. As previously discussed, connections 302, 304 with data sources may be used to receive and/or retrieve data for storyboards 312, 314. For example, in some embodiments, a database query or set of database queries may be run on data stored in a data source, accessible via a first connection 302, or received from the data source via the first connection 302, to generate a first dataset 306. However, in other embodiments, data may be received from or retrieved from data sources via connections 302, 304 in some other way. For example, data may be received from a data source and stored locally or remotely (e.g., in one or more remote servers or in the cloud) and then selectively retrieved and/or filtered (e.g., via database queries, manually selected filters, running a script, selection of specific data elements, etc.) to generate a dataset 306.

Data from the dataset may be used to generate one or more tiles 310. The 310 tiles may be charts or other widgets within the storyboards 312, 314 that include one or more visualizations. For example, data may be pulled from the first dataset 306 and used to generate a tile 310 that includes a visualization for some tracked metric or parameter (e.g., events, faults, number of cycles, downtime, production quantity, quality control pass percentage, etc.), over time, on a given day, for the shift, week, month, quarter, versus some benchmark, versus a target, versus another facility, and so forth. As shown in FIG. 4, a single storyboard (e.g., the first storyboard 312) may include one or more tiles 310 generated using data from one or more datasets 306, 308. Accordingly, a given storyboard (e.g., the first storyboard 312) may be generated based on data from one dataset or multiple dataset. Similarly, though the embodiment shown in FIG. 4 illustrates that a given tile 310 is generated based only on data from a single dataset 306, 308, it should be understood that in some embodiments, tiles 310 may be generated using data from multiple datasets 306, 308. Similarly as shown in FIG. 4, data from a single dataset (e.g., the first dataset 306 or the second dataset 308) may be used to generate tiles in multiple storyboards 312, 314.

Typically, datasets have been generated specifically for generation of respective storyboards. Accordingly, datasets and storyboards have generally had a one-to-one relationship and been closely related to one another. As a result, if a user wanted to generate a second storyboard based on a given dataset, the user might resort to making a copy of the dataset for the second storyboard, resulting in an inefficient use of resources. Further, a user may have difficulty attempting to configure a single storyboard based on multiple datasets. Accordingly, the present disclosure decouples datasets and storyboards such that individual datasets may be used to generate multiple storyboards and/or individual storyboards may be generated based on data from multiple datasets.

Figure 5:
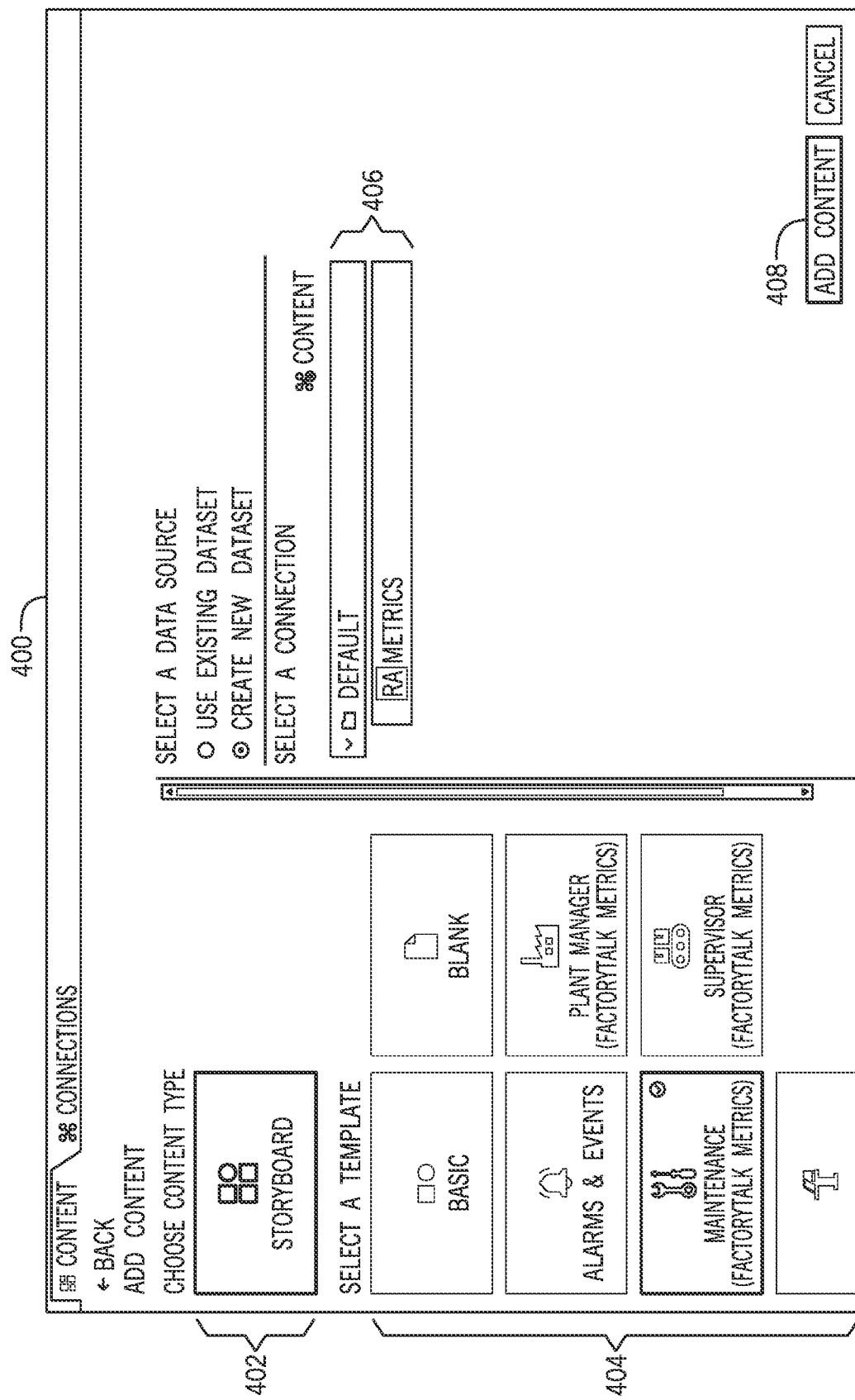
FIG. 5 illustrates a GUI for selecting a content type, a template, and a connection for one of the storyboards of FIG. 4, in accordance with aspects of the present disclosure.

FIGS. 5-8 depict how a storyboard may be configured using the disclosed techniques. FIG. 5 illustrates a GUI 400 for selecting a content type 402, template 404, and connection 406 to the data source. As shown, the user provides inputs selecting a content type (e.g., storyboard) from the available content types 402. As the present embodiments are related to storyboards, the storyboards tile is selected in the content type menu 402, however, it should be understood that in some embodiments, other content types may be available for selection. After a content type has been selected, the template menu may be populated with templates 404 associated with the selected content type. The templates may include templates that have been pre-configured for certain common uses or functions. For example, in the embodiment shown in FIG. 5, the available templates 404 include, among others, a plant manager template, a supervisor template, a machine operator template and a maintenance template. This may be a result of operators in different roles having a tendency to be interested in particular metrics, statistics, charts, tiles, visualizations, time duration, etc. Templates may be generated manually by a person or automatically generated after recognizing trends in storyboards created or customized by certain users and those users' roles. For example, a subject matter expert (SME) may develop storyboard templates, stock queries for retrieving data for the templates, charts within the templates, data aggregation, and so forth. Storyboard templates may be defined by included chart types, chart axes, chart configuration such as data labels, legends, tooltips, and datasets based on pre-defined queries that run to fetch data with or without aggregation and then filter the data for set time periods. Though the plant manager, supervisor, machine operator, and maintenance templates may be based on the role of a user viewing these storyboards and what a person in that role may be interested in seeing, other storyboard templates may be generated based upon the data displayed in the storyboard. For example, in the embodiment shown in FIG. 5, the available templates 404 include an alarms and events template and a basic template. Accordingly, these templates may include tiles and/or charts that include visualizations related to alarms and events and basic system information, respectively.

After a template has been selected, the connection menu 406 may be populated with connections for the selected template. In the embodiment shown in FIG. 5, the maintenance template has been selected, so the connection menu 406 includes an RA metrics connection as a default. As previously described, each template may include a collection of pre-configured tiles or charts that include visualizations of various parameters or operational data such that the user does not have to manually define every aspect of a storyboard. Correspondingly, each template may include one or more connections as a default for retrieving data for populating the tiles or charts of the storyboard. Accordingly, the templates may identify data to be used by the storyboard, database queries, or template database queries, for retrieving data used by the storyboards, and so forth. However, the templates may provide a baseline or collection of default options from which a user may customize to their liking. For example, a user may select the blank template from the template options 404 if they wish to design a storyboard from scratch. Further, the user may choose to add content 408 by specifying additional data to be included in a dataset, from which one or more storyboards may use data.

Figure 6:
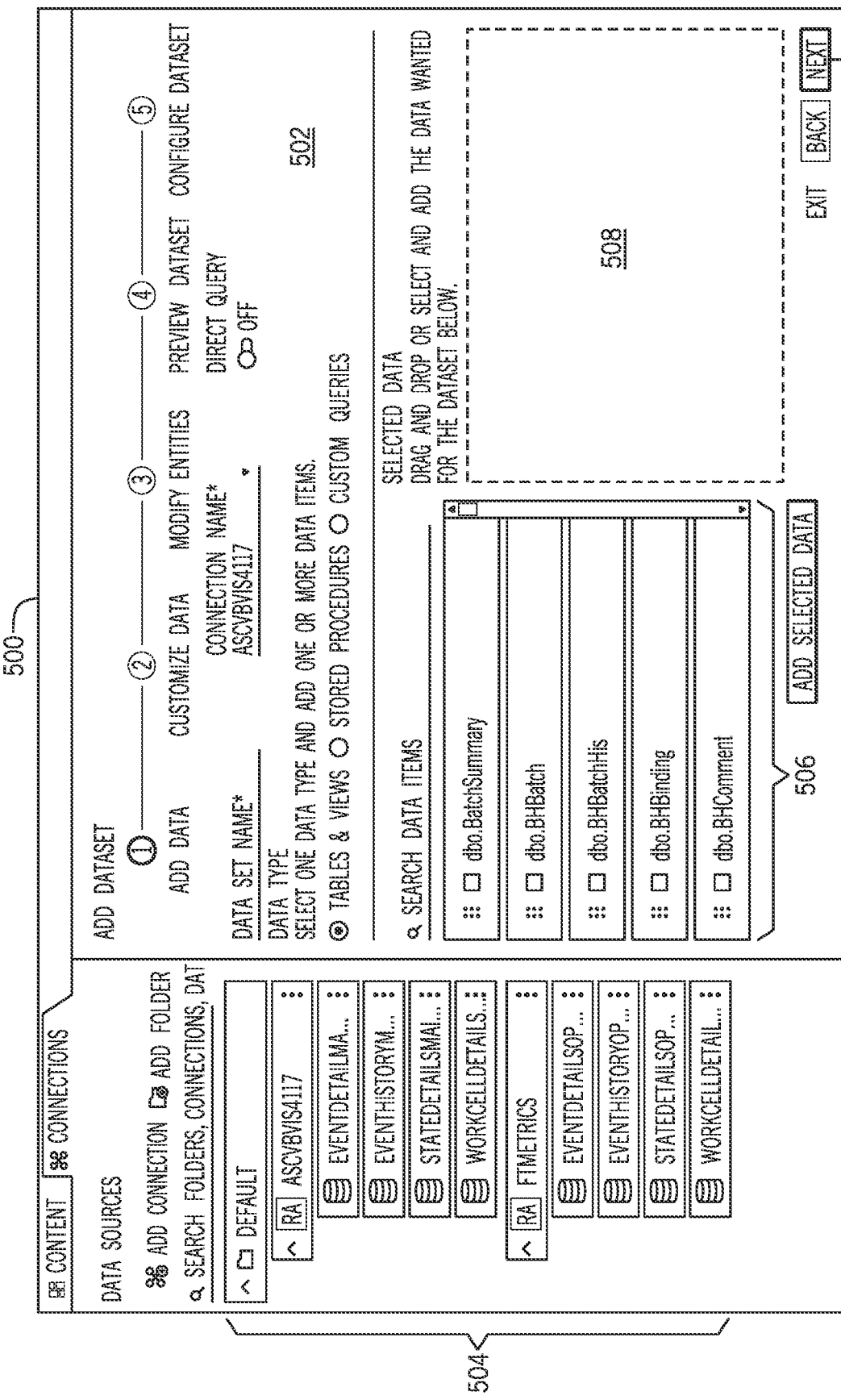
FIG. 6 illustrates a GUI for adding content to a dataset or creating a new dataset for one of the storyboards of FIG. 4, in accordance with aspects of the present disclosure.

FIG. 6 illustrates a GUI 500 for adding content to a dataset or creating a new dataset. As shown, a status region 502 includes a progress sequence identifying steps in the process for adding content to an existing dataset or creating a new dataset. The status region 502 also identifies a dataset name, a connection name, an indication of whether direct queries are turned on or off, and a selected data type (e.g., tables and views, stored procedures, custom queries, etc.) As the user provides inputs selecting data sources 504 and data elements 506, the status region may update accordingly.

As shown, the data sources menu 504 may include a listing of data sources, including folders, groups of databases, database tables, devices, file locations, etc., which may be displayed in a nested and/or collapsible format and navigable by the user. When a user selects a data source from the data source menu 504, a data items menu 506 may be updated to include data items from the selected data source. These data items may correspond to, for example, fields (e.g., columns) of a table, records (e.g., rows) of a table, particular metrics, entire tables, files (e.g., comma-separated values files), and so forth. A user may select one or more data items from the data items menu 506, either by selecting the data items (e.g., selecting a checkbox), or by dragging the data item into the selected data item window 508. As shown, the user may also provide custom queries, use a query creation tool, or otherwise identify data for a new connection. In such embodiments, the connection may be validated by generating a query or applying a provided query and confirming the connection based on the data returned. After a connection has been created, the connection may be saved for subsequent use in the present storyboard or other storyboards. Once data items have been selected, the user selects the next button 510 to move to the next step.

Figure 7:
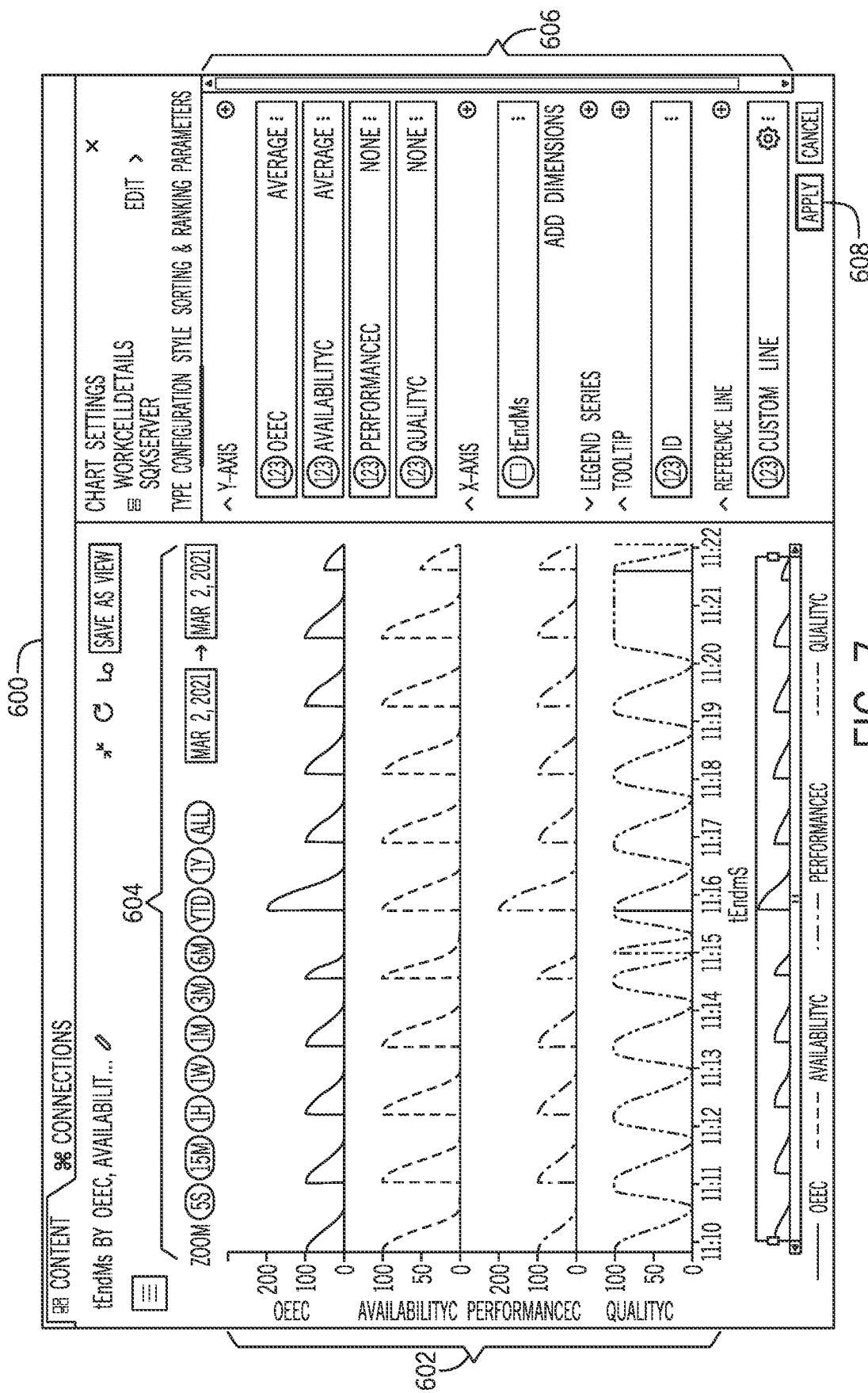
FIG. 7 illustrates a GUI for customizing how a particular chart is displayed on one of the storyboards of FIG. 4, in accordance with aspects of the present disclosure.

FIG. 7 illustrates a GUI 600 for customizing how a chart is displayed on a storyboard. A preview window 602 displays a preview of the chart as customized via the GUI 600.

In the illustrated embodiment, the preview window 602 includes plots of four selected parameters over a set period of time. However, it should be understood that if different types of visualizations are selected, the preview window 602 may look substantially different. A timeline menu 604 allows the user to select a start date, an end data, and/or an amount of time shown. By selecting two out of these three values (e.g., start time, end time, amount of time shown), the user may fully define the amount of time shown in the chart, and thus reflected in the preview window 602. The user may make selections in the configuration window to select the type of chart being created (e.g., time series plot, bar graph, stacked bar graph, pie chart, score card, table, etc.), the style of the chart, how selected parameters are sorted and/or ranked, and so forth in the configuration window 606. As shown, the user may also use the configuration window 606 to select values to plot on the X-axis, values to plot on the Y-axis, how the tool tip is displayed, reference line style, and so forth. It should be understood that though the data fields in the configuration window 606 of FIG. 7 are for a time series plot, as different chart types are selected, the options available in the configuration window 606 may change. Further, based on the storyboard template selected, the time scale and the parameters in the configuration window 606 may be pre-set according to the template. However, a user may manually change parameters away from the default values as he or she wishes to fit his or her needs. Once the user is satisfied with the selected parameters, the user may select the apply button 608 to update the chart and storyboard based on the selected parameters.

Figure 8:
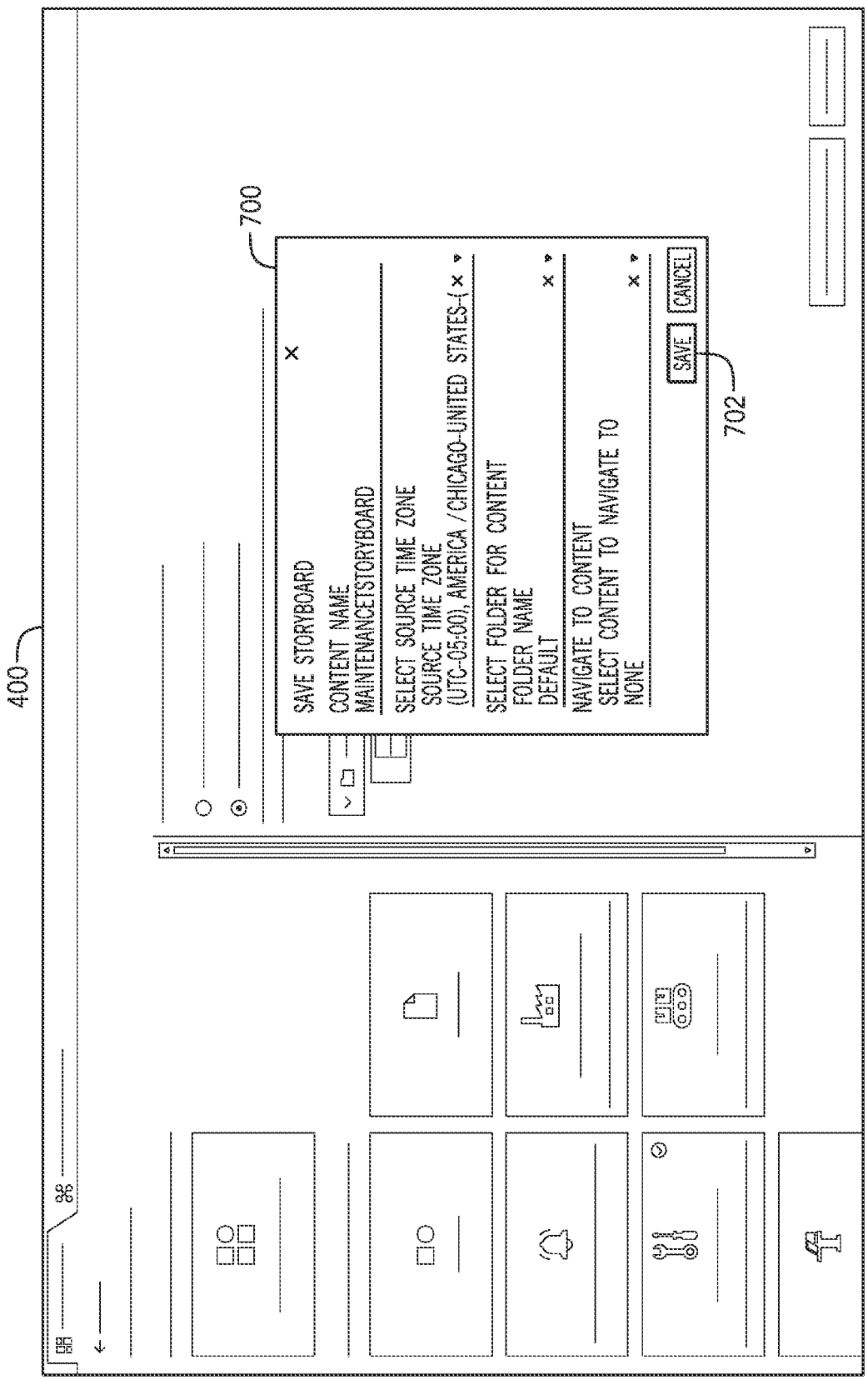
FIG. 8 illustrates the GUI of FIG. 5 after the storyboard has been configured, in accordance with aspects of the present disclosure.

FIG. 8 illustrates the GUI 400 of FIG. 5 after the storyboard has been configured. As shown, the GUI 400 displays a popup window 700 that identifies various information about the storyboard, such as the name, the name of the content, time zones, content location(s), path to content, etc. The user may select the save button 702 to save the storyboard for use.

Figure 9:
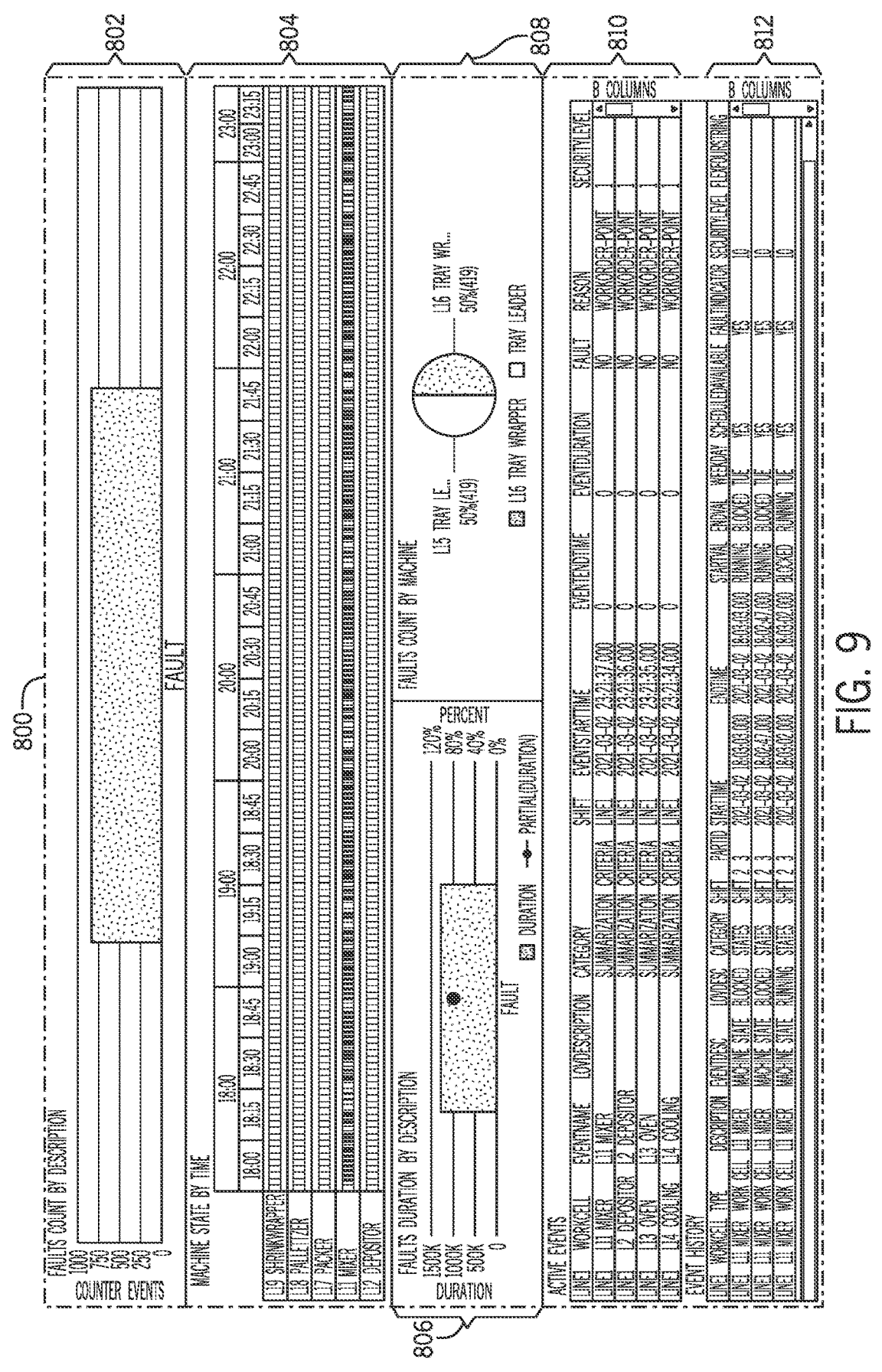

FIG. 9 illustrates a sample storyboard 800. As shown, the storyboard 800 has a plurality of charts or tiles, including a faults count by description tile 802, a machine state by time tile 804, a fault duration by description tile 806, a fault count by machine tile 808, an active events tile 810, and an events history tile 812. The faults count by description tile 802 is a bar graph that identifies a number of faults that match a set description. For example, the description may correspond to a facility, a type of machine, on a particular line or type of line, and so forth. The machine state by time tile 804 identifies the states of a shrink wrapper, a palletizer, a packer, a mixer, and a depositor over time, where the X-axis is time, the Y-axis corresponds to the different machines, and the color or shading at a given time indicates the state of the machine. The fault duration by description tile 806 is a bar graph that identifies a duration of faults that match the set description (e.g., the description may correspond to a facility, a type of machine, on a particular line or type of line, and so forth). The fault count by machine tile 808 is a pie chart illustrating how fault counts are distributed across multiple machines. The active events tile 810 is a table of information associated with active events associated with various work cells (e.g., mixer, depositor, oven, cooling, etc.). This information may include an event name, event categories, event description, shift, event start time, event end time, event duration, whether the event was associated with a fault, a reason for the event, and a security level for the event, among other information. Similarly, the events history tile 812 is a table of information associated with past events. This information may include a work cell, an event type, an event description, a category, a shift, a part ID, a start time, an end time, a start value, and end value, a day of the week, whether a schedule is available, whether the event was associated with a fault, and a security level associated with an event, among other information. It should be understood, however, that the storyboard shown in FIG. 9 is merely an example and that other embodiments of storyboards having different charts/tiles and displaying different data are also envisaged. Accordingly, the storyboard 800 shown in FIG. 9 is merely an example and not intended to limit the scope of the claims.

FIG. 10 is a flow chart of a process 900 for configuring and modifying storyboards associated with an industrial automation system. At block 902, the process receives an input indicative of a selection of a storyboard template. The storyboard template may be selected from a list or an array of preview tiles/thumbnails. The template may have been automatically generated based on collected data or generated by a person. The template may be related to a role of a user (e.g., plant manager, supervisor, maintenance worker, machine operator, service technician, etc.), based on the type of machine/line from which the data is collected (e.g., soda bottling, beer brewing, cosmetics, pet food, fertilizer, oil and gas extraction, chemical processing, etc.), based on the type of data being viewed (e.g., basic info, alarms and events, etc.), or some other characteristic. In some embodiments, the template may be fully defined, whereas in other embodiments, the template may only be partially defined, such that the user completes the full definition of the template before use.

At block 904, the process 900 receives inputs indicative of selections of one or more connections to data sources. In some embodiments, connections may be pre-defined by the selected templates, but the process 900 may allow for the user to add connections, remove connections, or modify predefined connections. In other embodiments, templates may not include connections and the connections are created/provided by the user. As previously described, providing connections may include, for example, providing database queries, using a database query tool to generate database queries, providing file paths or mappings to data elements, selecting particular fields or records within a table or database, selecting data elements from a list, and so forth. Accordingly, in embodiments in which a user does not provide database queries, the process 900 may automatically generate database queries based on the connections selected in block 904.

At 906, the storyboard template is retrieved based on the selection received in block 902. The storyboard template may be stored locally (e.g., on the device(s) performing the process 900) and retrieved from local memory, or stored on a remote device and retrieved from the remote device via the internet or a network connection. At block 908 data is retrieved from the data sources via the connections identified in block 904. In some embodiments, the retrieved template may include database queries, connections, file locations, mappings, etc. that may be used to retrieve the data. At block 910, a dataset may be generated based on the retrieved data. In such embodiments, a dataset may be generated a single time and used for one or more storyboards. In other embodiments, the data may be retrieved and the dataset updated periodically, such as hourly, daily, weekly, at the end of each shift, when the storyboard is displayed, on demand, etc.

At block 912, the storyboard is generated in accordance with the retrieved template based on the retrieved data. In some embodiments, generating the storyboard may include processing the retrieved data by applying an algorithm, running a script, applying a machine learning model or classifier, filtering the data, removing anomalous data points, and so forth. The storyboard may or may not be generated by the device that displays the storyboard to the user. Accordingly, in some embodiments, the storyboard may be generated by a centralized on-prem device and then transmitted to a client device for display. However, in other embodiments, the storyboard may be generated and displayed by the client device.

At block 914, the process 900 may receive one or more inputs making modifications to the storyboard. The modifications may include relatively small modifications, such as adjustments to time periods plotted, data fields shown, scale, etc. However, in other embodiments, the modifications may be more substantial, such as adding one or more connections, adding/removing/replacing a tile, changing a plot type, plotting a different value, and so forth. When a storyboard is generated or a chart is added to a storyboard, the chart may be generated with the default dataset for the storyboard. However, the user may reconfigure the chart to be based on any dataset or datasets that are available to the user. Accordingly, a user may add data from various sources to a single storyboard. At block 916, the storyboard may be updated based on the received modifications and any adjustments to the underlying code may be saved. If the modifications affect the template, the template may be updated or a new template may be generated that incorporates the modifications. Along these lines, users may save storyboards (e.g., customized or not customized) as templates to serve as the basis for future storyboards.

FIG. 11 is a flow chart of a process 1000 for generating storyboards based on retrieved data. At block 1002, inputs are received identifying data to be retrieved from one or more data sources. As described previously, data may be identified via selected storyboard templates. In other embodiments, data to be retrieved may be identified via database queries, using a database query tool to generate database queries, providing file paths or mappings to data elements, selecting particular fields or records within a table or database, selecting data elements from a list, and so forth. Accordingly, in embodiments in which a user does not provide database queries, the process 1000 may automatically generate database queries based on selected data.

At block 1004, the process 1000 may retrieve the identified data from the data sources, which may be stored locally, on the network, on a remote server, in the cloud, on the internet, etc. At block 1006, the process 1000 generates one or more datasets based on the retrieved data. Datasets may be mapped to database tables, views, stored procedures, custom queries, etc. and based on data sources, queues, streaming, connections, and so forth. In such embodiments, a dataset may be generated a single time and used for one or more storyboards. In other embodiments, the data may be retrieved and the dataset updated periodically, such as hourly, daily, weekly, at the end of each shift, when the storyboard is displayed, on demand, etc. In some embodiments, different data sets may correspond to different industrial automation devices or systems, different portions of product lines, different product lines, different facilities, and so forth.

At block 1008, one or more storyboards are generated based on the one or more generated datasets. In some embodiments, a single dataset may be used to generate a single storyboard and a single storyboard may be generated based on a single dataset. However, in other embodiments, a single storyboard may be generated using data from multiple datasets. Further, in some embodiments, a data in a single dataset may be used to generate multiple storyboards. In some embodiments, generating the storyboard may include processing the retrieved data by applying an algorithm, running a script, applying a machine learning model or classifier, filtering the data, removing anomalous data points, and so forth. The storyboard may or may not be generated by the device that displays the storyboard to the user. Accordingly, in some embodiments, the storyboard may be generated by a centralized on-prem device and then transmitted to a client device for display. However, in other embodiments, the storyboard may be generated and displayed by the client device.

The present disclosure includes techniques for configuring storyboards (e.g., dashboards) containing multiple charts or tiles (e.g., widgets) using data collected from one or more industrial automation systems. First, the present application includes a graphical user interface (GUI) for configuring a storyboard that does not require a user to write code, write database queries, be intimately familiar with the underlying data, or configure every parameter or setting of the storyboard. Instead, a user selects a storyboard template, selects one or more connections to data or databases to be used to generate the charts of the storyboard, provides storyboard details (e.g., storyboard name, etc.), and then generates the storyboard. Storyboards may be modified by the user after creation as desired. Further, the user can create new connections with compatible data sources validated against queries. Connections can be made for specific types of manufacturing data and saved for subsequent use. In some embodiments, subject matter experts (SMEs) may help to develop stock queries, charts, data aggregation, and storyboard templates. The storyboard templates may be defined by included chart types, chart axes, chart configuration such as data labels, legends, tooltips, and datasets based on pre-defined queries that run to fetch data with or without aggregation and then filter the data for set time periods. For example, if the user wishes, the user can rapidly create new storyboards by single-clicking a pre-configured template and connection(s). If the user wishes, generated storyboards may be saved as templates and modified as needed.

Further, the storyboards may be extensible such that relationships between storyboards and datasets may be defined as "many-to-many" relationships. For example, some storyboards may include charts generated based on data pulled from multiple datasets. When a storyboard is generated or a chart is added to a storyboard, the chart may be generated with the default dataset for the storyboard. However, the user may reconfigure the chart to be based on any dataset or datasets that are available to the user. Accordingly, a user may add data from various sources to a single storyboard. Correspondingly, multiple storyboards may include charts based on data from a single dataset. For example, a user may create a new storyboard having one or more charts that use an already-existing dataset used by one or more other storyboards. Accordingly, once a dataset has been created using one or more database queries, the dataset may be used as a source for any chart or storyboard. This prevents duplication of data, which conserves computing resources, and also prevents users from having to repeat the dataset creating process. Datasets may be mapped to database tables, views, stored procedures, custom queries, etc. and based on data sources, queues, streaming, connections, and so forth.

Use of the disclosed techniques allows for efficient configuring of storyboards for industrial automation systems without having to rely on users to write code, construct database queries, be intimately familiar with the underlying data, the intricacies of storyboard settings, and so forth. Accordingly, the disclosed techniques enable novice users to quickly and easily configure storyboards for industrial automation systems and enable experienced users to configure storyboards more efficiently. Further, by decoupling storyboards and datasets, users can build more robust and rich storyboards using data from multiple datasets. Moreover, decoupling storyboards and datasets reduces or eliminates the need for users to generate duplicative datasets, thus reducing the inefficient use of computing resources and retrieving data for, generating, and storing duplicative datasets.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory, computer readable medium storing instructions that, when executed by a processor, cause the processor to perform operations comprising:
   receiving, via a graphical user interface (GUI), a first input indicative of a request to generate a storyboard comprising one or more visualizations associated with operation of one or more industrial automation systems, wherein the request comprises an identification of a template;
   generating a populated menu of connections to data sources based on the template;
   receiving a second input indicative of an identification of first and second respective connections, from the populated menu of connections, to first and second respective data sources and an identification of first and second data from the first and second respective data sources;
   retrieving the first data from the first data source via the first connection;
   retrieving the second data from the second data source via the second connection;
   generating a first dataset based on the first data retrieved from the first data source via the first connection;
   generating a second dataset, separate from the first dataset, based on the second data retrieved from the second data source via the second connection; and
   generating for display via the GUI, the storyboard based on the first dataset and the second dataset.

2. The non-transitory, computer readable medium of claim 1, wherein the storyboard comprises:
   a first tile comprising a first visualization of the one or more visualizations, wherein the first tile is generated based on the first dataset; and
   a second tile comprising a second visualization of the one or more visualizations, wherein the second tile is generated based on the second dataset.

3. The non-transitory, computer readable medium of claim 1, wherein the first data is associated with a first industrial automation system of the one or more industrial automation systems, and wherein the second data is associated with a second industrial automation system of the one or more industrial automation systems.

4. The non-transitory, computer readable medium of claim 1, wherein the first data is associated with a first portion of a production line of the one or more industrial automation systems, and wherein the second data is associated with a second portion of the production line of the one or more industrial automation systems.

5. The non-transitory, computer readable medium of claim 1, wherein the first data is associated with a first production line of the one or more industrial automation systems, and wherein the second data is associated with a second production line of the one or more industrial automation systems.

6. The non-transitory, computer readable medium of claim 1, wherein the first data is associated with a first facility, and wherein the second data is associated with a second facility.

7. The non-transitory, computer readable medium of claim 1, wherein the first and second respective data sources comprise one or more databases, one or more industrial automation devices, one or more computing devices, one or more programmable logic controllers (PLCs), or any combination thereof.

8. The non-transitory, computer readable medium of claim 1, wherein the one or more visualizations comprise a time series plot, a bar graph, a stacked bar graph, a pie chart, a score card, a table, or any combination thereof.

9. A non-transitory, computer readable medium storing instructions that, when executed by a processor, cause the processor to perform operations comprising:
   receiving, via a first graphical user interface (GUI), a first input indicative of a request to generate a first storyboard comprising one or more first visualizations associated with operation of one or more industrial automation systems, wherein the request comprises an identification of a template;
   generating a populated menu of connections to data sources based on the template;
   receiving a second input indicative of an identification of first and second respective connections, from the populated menu of connections, to first and second respective data sources and an identification of first and second data from the first and second respective data sources;
   retrieving the first data from the first data source via the first connection;
   retrieving the second data from the second data sources via the second connection;
   generating a first dataset based on the first data retrieved from the first data source via the first connection;
   generating a second dataset, separate from the first dataset, based on the second data retrieved from the second data source via the second connection;
   generating for display via the first GUI, the first storyboard based on the first dataset and the second dataset;
   receiving, via the first GUI or a second GUI, a third input indicative of a request to generate a second storyboard comprising one or more second visualizations associated with the operation of the one or more industrial automation systems; and generating for display via the first GUI or the second GUI, the second storyboard based on the first dataset and the second dataset.

10. The non-transitory, computer readable medium of claim 9, wherein the first storyboard is configured for a first user role, and wherein the second storyboard is configured for a second user role.

11. The non-transitory, computer readable medium of claim 10, wherein the first user role comprises a plant manager, and wherein the second user role comprises supervisor.

12. The non-transitory, computer readable medium of claim 9, wherein the one or more first visualizations and the one or more second visualizations have at least one visualization in common.

13. The non-transitory, computer readable medium of claim 9, wherein the one or more visualizations comprise a time series plot, a bar graph, a stacked bar graph, a pie chart, a score card, a table, or any combination thereof.

14. The non-transitory, computer readable medium of claim 9, wherein the first and second respective data sources comprise one or more databases, one or more industrial automation devices, one or more computing devices, one or more programmable logic controllers (PLCs), or any combination thereof.

15. A method, comprising:
receiving, via a first graphical user interface (GUI), a first input indicative of a request to generate a first storyboard comprising one or more first visualizations associated with operation of one or more industrial automation systems, wherein the request comprises an identification of a template;

generating a populated menu of connections to data sources based on the template;

receiving a second input indicative of an identification of first and second respective connections, from the populated menu of connections, to first and second respective data sources and an identification of first and second data from the first and second respective data sources;

retrieving the first data from the first data source via the first connection;

retrieving the second data from the second data sources via the second connection;

generating a first dataset based on the first data retrieved from the first data source via the first connection;

generating a second dataset, separate from the first dataset, based on the second data retrieved from the second data source via the second connection;

generating for display via the first GUI, the first storyboard based on the first dataset and the second dataset;

receiving, via the first GUI or a second GUI, a third input indicative of a request to generate a second storyboard comprising one or more second visualizations associated with the operation of the one or more industrial automation systems; and generating for display via the first GUI or the second GUI, the second storyboard based on the first dataset and the second dataset.

16. The method of claim 15, wherein the one or more first visualizations and the one or more second visualizations have at least one visualization in common.

17. The method of claim 15, wherein the first storyboard comprises:
a first tile comprising a first visualization generated based on the first dataset; and
a second tile comprising a second visualization generated based on the second dataset.

18. The method of claim 15, wherein the first data is associated with a first industrial automation system of the one or more industrial automation systems, and wherein the second data is associated with a second industrial automation system of the one or more industrial automation systems.

19. The method of claim 15, wherein the second input is received via the first GUI, and wherein the second storyboard is displayed via the first GUI.

20. The method of claim 15, wherein the second input is received via the second GUI, and wherein the second storyboard is displayed via the second GUI.

* * * * *